(12) United States Patent
Tsushima

(10) Patent No.: US 12,553,371 B2
(45) Date of Patent: Feb. 17, 2026

(54) ENGINE

(71) Applicant: Yanmar Power Technology Co., Ltd., Osaka (JP)

(72) Inventor: Kohei Tsushima, Osaka (JP)

(73) Assignee: Yanmar Power Technology Co., Ltd., Osaka (JP)

(*) Notice: Subject to any disclaimer, the term of this patent is extended or adjusted under 35 U.S.C. 154(b) by 379 days.

(21) Appl. No.: 17/440,878

(22) PCT Filed: Mar. 5, 2020

(86) PCT No.: PCT/JP2020/009338
§ 371 (c)(1),
(2) Date: Sep. 20, 2021

(87) PCT Pub. No.: WO2020/195665
PCT Pub. Date: Oct. 1, 2020

(65) Prior Publication Data
US 2022/0162973 A1    May 26, 2022

(30) Foreign Application Priority Data
Mar. 22, 2019  (JP) .................................. 2019-054477

(51) Int. Cl.
*F01N 3/28*       (2006.01)
*F01N 3/022*      (2006.01)
(Continued)

(52) U.S. Cl.
CPC ......... *F01N 3/2839* (2013.01); *F01N 3/0222* (2013.01); *F01N 3/2066* (2013.01);
(Continued)

(58) Field of Classification Search
CPC .... F01N 3/2839; F01N 3/0222; F01N 3/2066; F01N 13/009; F01N 13/1844;
(Continued)

(56) References Cited

U.S. PATENT DOCUMENTS 8,695,748 B2 * 4/2014 Togo ....................... B60K 5/00
60/299
9,624,813 B2 * 4/2017 Winterhoff ............ F01N 13/008
(Continued)

FOREIGN PATENT DOCUMENTS

JP       2015083803 A    4/2015
JP    2015-0190317 A   11/2015
(Continued)

*Primary Examiner* — Jacob B Meyer
(74) *Attorney, Agent, or Firm* — Chris Mizumoto

(57) ABSTRACT

An engine has an ATD that purifies exhaust gas. The engine is provided with an engine body, a support base, a front-side support bracket, and a rear-side support bracket. The support base supports an exhaust gas purification device. The front-side support bracket is mounted to the engine body and is disposed on one side of the engine body, and supports the support base. The rear-side support bracket is mounted to the engine body and is disposed on a side opposite to the front-side support bracket with the engine body therebetween, and supports the support base. The front-side support bracket has a vertically-mounted boss mounted in the vertical direction with respect to the support base. The rear-side support bracket has a horizontally-mounted boss mounted in the horizontal direction with respect to the support base.

6 Claims, 12 Drawing Sheets

(51) Int. Cl.
*F01N 3/20* (2006.01)
*F01N 13/00* (2010.01)
*F01N 13/18* (2010.01)
*F02B 77/00* (2006.01)

(52) U.S. Cl.
CPC ....... *F01N 13/009* (2014.06); *F01N 13/1844* (2013.01); *F02B 77/00* (2013.01); *F01N 2510/068* (2013.01); *F01N 2590/08* (2013.01); *F01N 2610/02* (2013.01)

(58) Field of Classification Search
CPC ........... F01N 2510/068; F01N 2590/08; F01N 2610/02; F02B 77/00
See application file for complete search history.

(56) References Cited

U.S. PATENT DOCUMENTS

| | | | | |
|---|---|---|---|---|
| 10,184,375 | B2* | 1/2019 | Kimura | F01N 3/021 |
| 10,436,093 | B2* | 10/2019 | Matsui | F01N 11/007 |
| 2008/0072576 | A1* | 3/2008 | Honda | F01N 3/2066 |
| | | | | 60/301 |
| 2010/0186388 | A1* | 7/2010 | Olsen | F01N 13/00 |
| | | | | 123/195 A |
| 2010/0186394 | A1* | 7/2010 | Harrison | F01N 13/18 |
| | | | | 60/299 |
| 2010/0196219 | A1* | 8/2010 | Endo | F01N 3/2066 |
| | | | | 422/168 |
| 2012/0017574 | A1* | 1/2012 | Hasan | F01N 13/1805 |
| | | | | 60/297 |
| 2012/0273648 | A1* | 11/2012 | Maske | F01N 13/1805 |
| | | | | 248/674 |
| 2013/0298655 | A1* | 11/2013 | Kowalkowski | F01N 3/208 |
| | | | | 73/114.75 |
| 2013/0305688 | A1* | 11/2013 | Kosaka | F01N 13/1822 |
| | | | | 60/272 |
| 2013/0343853 | A1* | 12/2013 | Sato | E02F 9/0866 |
| | | | | 414/719 |
| 2014/0290222 | A1* | 10/2014 | Sawada | F01N 3/24 |
| | | | | 60/286 |
| 2014/0290781 | A1* | 10/2014 | Ozaki | F01N 13/009 |
| | | | | 138/106 |
| 2014/0305110 | A1* | 10/2014 | Himoto | F01N 13/08 |
| | | | | 29/428 |
| 2015/0064072 | A1* | 3/2015 | Niaz | F01N 13/1805 |
| | | | | 422/168 |
| 2015/0211209 | A1* | 7/2015 | Okuda | F01N 3/035 |
| | | | | 180/309 |
| 2017/0009628 | A1* | 1/2017 | Kimura | F01N 3/103 |
| 2017/0204766 | A1* | 7/2017 | Matsui | F01N 13/008 |
| 2021/0123404 | A1* | 4/2021 | Tsushima | F02M 55/00 |
| 2022/0162973 | A1* | 5/2022 | Tsushima | F01N 3/2066 |

FOREIGN PATENT DOCUMENTS

| | | |
|---|---|---|
| JP | 2015190317 A | 11/2015 |
| JP | 2016075213 A | 5/2016 |

* cited by examiner

ENGINE

CROSS-REFERENCE

This application is a US National Stage Application under 35 U.S.C. § 371 of International Application No. PCT/JP2020/009338 filed Mar. 5, 2020, which claims foreign priority of JP2019-054477 filed Mar. 22, 2019, the disclosures of which are hereby incorporated by reference in their entirety.

TECHNICAL FIELD

The present invention relates to an engine including an exhaust gas purification device. Specifically, the present invention relates to a configuration in which an exhaust gas purification device is mounted on an engine.

BACKGROUND ART

Conventionally, a configuration for purifying the exhaust gas of an engine by use of an exhaust gas purification device has been known. Patent Literature 1 discloses a construction machine having this kind of configuration.

The construction machine of Patent Literature 1 has a configuration in which an engine and an exhaust gas purification device disposed separately from the engine are arranged inside an engine room and the exhaust gas purification device is supported above a hydraulic pump by a support member.

CITATION LIST

Patent Literature

Patent Literature 1: PCT International Publication No. WO 2012/056643

DISCLOSURE OF INVENTION

Problems to be Solved by the Invention

However, in the configuration of the above-mentioned Patent Literature 1, since the exhaust gas purification device is disposed separately from the engine, a space for arranging the engine and the exhaust gas purification device is required. From the viewpoint of space saving, although a structure in which an exhaust gas purification device is arranged on the upper side of an engine and the exhaust gas purification device is supported on the engine has been proposed, a structure of an engine body is complicating, and therefore a mounting structure with which an exhaust gas purification device can be easily mounted on an engine body has been desired.

The present invention has been made in view of the above circumstance, and an object of the present invention is to provide an engine in which an exhaust gas purification device can be easily mounted on an engine body without the need for a jig or the like for position determination.

Means for Solving the Problems and Effect of the Invention

The problem to be solved by the present invention is as described above, and the means for solving this problem and effects of the means will be explained below.

According to an aspect of the present invention, an engine having the configuration below is provided. That is, this engine has an exhaust gas purification device that purifies exhaust gas. The engine includes an engine body, a support base, a first support bracket, and a second support bracket. The support base is to support the exhaust gas purification device. The first support bracket is arranged on one side of the engine body, to be mounted on the engine body, so as to support the support base. The second support bracket is arranged on the opposite side of the engine body in relation to the first support bracket to be mounted on the engine body, so as to support the support base. The first support bracket has a vertically-mounted part that is mounted on the support base in a vertical direction. The second support bracket has a horizontally-mounted part that is mounted on the support base in a horizontal direction.

Accordingly, the exhaust gas purification device can be easily supported above the engine body. Further, by supporting the support base from both sides of the engine body, the support base can be supported in a stable state. Further, by arranging the vertically-mounted part and the horizontally-mounted part respectively on the first support bracket and the second support bracket, the position of the support base (or the exhaust gas purification device) can be accurately determined without the need for a jig for position determination to be used for mounting the support base on which the exhaust gas purification device is placed. Therefore, the assemblage workability is preferable.

It is preferable that the above-described engine has the configuration below. That is, the engine includes a flywheel and a cooling fan. The cooling fan is to rotate for cooling. The cooling fan and the flywheel are arranged on sides that are opposite to each other in relation to the engine body interposed therebetween. The first support bracket is arranged on the cooling fan side. The second support bracket is arranged on the flywheel side.

Accordingly, since the support base is mounted on the first support bracket in the vertical direction, the cooling fan is less likely to get in the way at the time of work for inserting and mounting a bolt or the like. Therefore, the support base can be easily fixed to the first support bracket, which is fixed to the engine body.

It is preferable that the above-described engine has the configuration below. That is, the engine includes a third support bracket and a fourth support bracket. the third support bracket is arranged on a side that is different from any of the side of the engine body on which the first support bracket is arranged and the side on which the second support bracket is arranged. The fourth support bracket is arranged on the opposite side of the engine body in relation to the third support bracket. The third support bracket and the fourth support bracket are configured at least with a first component to be mounted on the engine body and a second component to be mounted on the support base.

Accordingly, since the support base can be supported on the four sides, more stable support can be realized. Further, since the third support bracket and the fourth support bracket are configured so that positional change of each component is allowed, the support base can be preferably supported while the position of the support base can be determined with the first support bracket and the second support bracket.

The above-described engine preferably has the configuration below. That is, the engine includes a mounting member. The mounting member is used for mounting the exhaust gas purification device onto the support base. The support base is equipped with multiple fixing parts capable of fixing the mounting member.

Accordingly, since the mounting position of the exhaust gas purification device onto the support base can be changed stepwise, a common support base can be used for exhaust gas purification devices of multiple specifications. As a result, the manufacturing cost can be reduced, and the labor of components management can be reduced.

DESCRIPTION OF EMBODIMENTS

Figure 1:
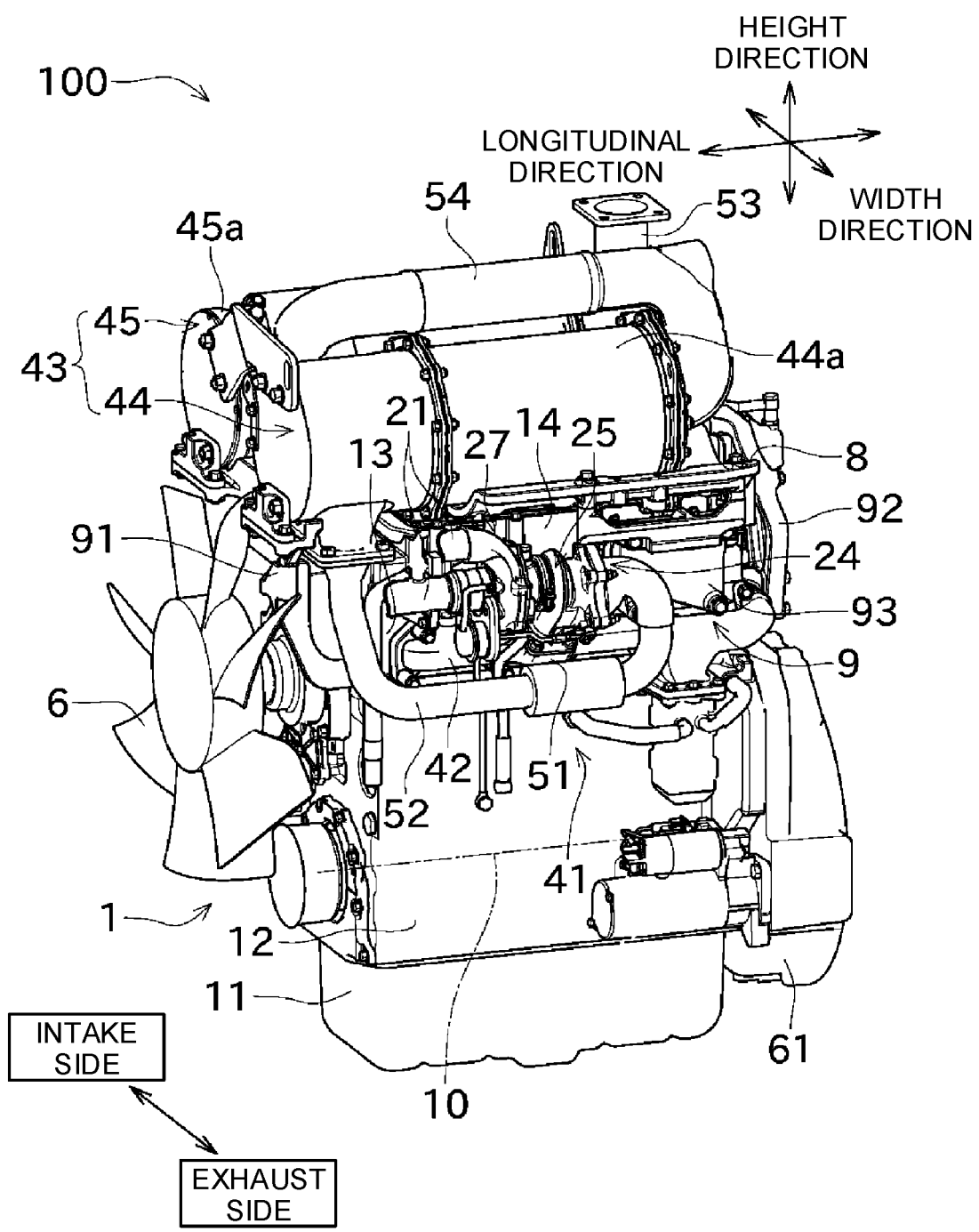
FIG. 1 is a perspective view illustrating a configuration of an engine according to an embodiment of the present invention.
Figure 2:
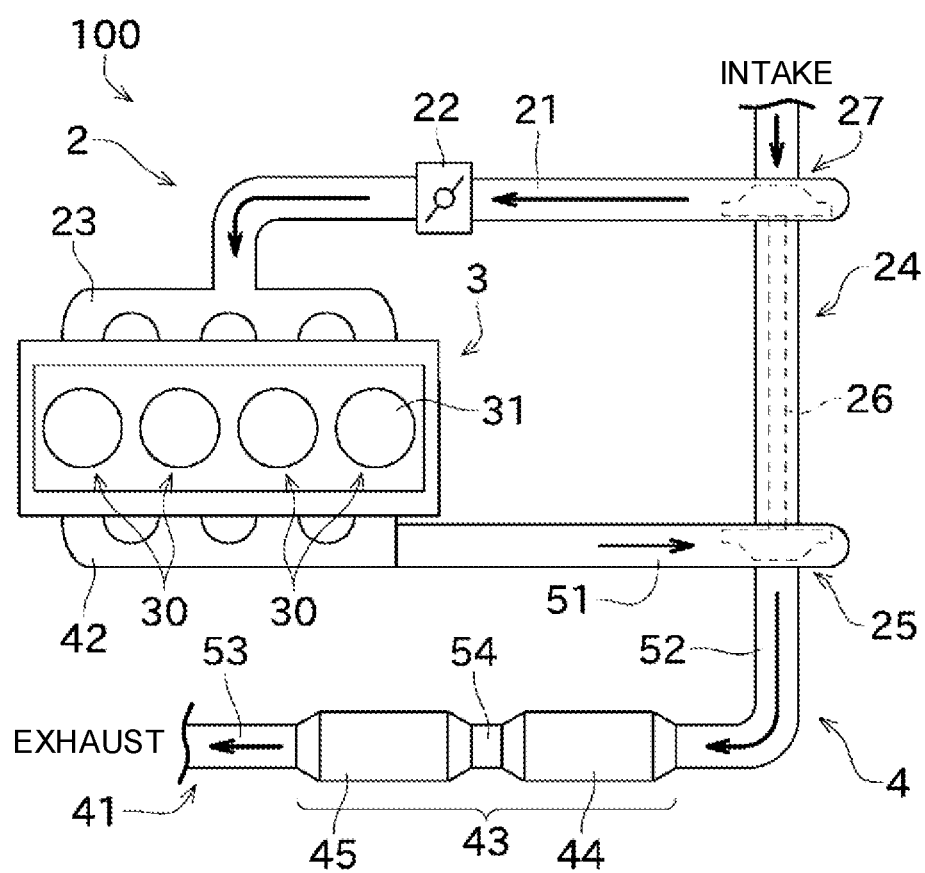
FIG. 2 is a conceptual diagram illustrating intake and exhaust flows in the engine.

Next, an explanation will be given of an embodiment of the present invention with reference to the drawings. FIG. 1 is a perspective view illustrating a configuration of the engine 100 according to an embodiment of the present invention. FIG. 2 is a conceptual diagram illustrating intake and exhaust flows in the engine 100.

The engine 100 illustrated in FIG. 1 is a diesel engine, which is to be mounted on, for example, an agricultural machine such as a tractor, a construction machine such as a skid-steer loader, etc. The engine 100 is configured as, for example, an in-line 4-cylinder engine having four cylinders. Note that the number of cylinders is not limited to four.

First, the basic configuration of the engine body 1 included in the engine 100 will be explained. Note that, in the explanation below, the vertical direction of the engine 100 illustrated in FIG. 1 is referred to as the height direction. The engine 100 has an elongated approximately rectangular shape in a plan view, and the longitudinal direction thereof is aligned with the direction in which the crankshaft 10 extends. In the explanation below, the longitudinal direction of the engine 100 means the direction of the rotation axis of the crankshaft 10. Further, the direction orthogonal to both of the height direction and the longitudinal direction is referred to as the width direction of the engine 100. The height direction of the engine 100 corresponds to the first direction, the longitudinal direction corresponds to the second direction, and the width direction corresponds to the third direction.

As illustrated in FIG. 1, etc., the engine body 1 is mainly configured with the oil pan 11, the cylinder block 12, the cylinder head 13, and the head cover 14, which are arranged in order from below.

The oil pan 11 is disposed at a lower part (lower-side end part) of the engine 100. The oil pan 11 is formed in the shape of a container whose upper part is open. Inside the oil pan 11, engine oil for lubricating the engine 100 is stored.

The cylinder block 12 is mounted on the upper side of the oil pan 11. A recess part for accommodating the crankshaft 10, etc., is formed in the lower part of the cylinder block 12. Although omitted in FIG. 1, multiple cylinders 30 are formed on the upper part of the cylinder block 12 as illustrated in FIG. 2. The four cylinders 30 are arranged side by side along the axial direction of the crankshaft 10.

A piston is housed in each cylinder 30. The piston inside a cylinder 30 can move in the vertical direction. The piston is connected to the crankshaft 10 via a connecting rod which is not illustrated in the drawings. The crankshaft 10 rotates as the pistons reciprocate in the respective cylinders 30.

As illustrated in FIG. 1, etc., the cylinder head 13 is mounted on the upper side of the cylinder block 12. The cylinder head 13 and the cylinder block 12 form the combustion chambers 31 illustrated in FIG. 2 corresponding to the respective cylinders 30.

The head cover 14 is disposed on the upper side of the cylinder head 13. Inside the head cover 14, there is housed a valve operating mechanism configured with a push rod, rocker arm, etc., which are not illustrated in the drawings, for operating an intake valve and exhaust valve, which are not illustrated in the drawings.

The cooling fan 6 is mounted on one side of the longitudinal direction of the engine 100 in a rotatable manner. The cooling fan 6 rotates by transmission of the power of the crankshaft 10. The cooling fan 6 generates an air flow by rotating, in order to allow air to pass through a radiator (not illustrated in the drawings) for cooling the cooling water of the engine 100 and to blow air to the engine 100. As a result, the engine 100 is cooled.

The flywheel housing 61 is arranged on the side opposite to the cooling fan 6 in the longitudinal direction of the engine 100. Although not illustrated in the drawings, a flywheel of the engine 100 is arranged inside the flywheel housing 61. Therefore, by mentioning the flywheel housing 61 side in the explanation below, it substantially means the flywheel side.

Subsequently, focusing on the intake and exhaust flows, the configuration of the engine 100 of the present embodiment will be briefly explained with reference to FIG. 2, etc.

As illustrated in FIG. 2, the engine 100 includes the intake unit 2, the power generation unit 3, and the exhaust unit 4 as main configurations.

The intake unit 2 intakes air from the outside. The intake unit 2 includes the intake pipe 21, the throttle valve 22, the intake manifold 23, and the turbocharger 24.

The intake pipe 21 configures an intake passage, so that air taken in from the outside can flow to the inside.

The throttle valve 22 is arranged in the middle part of the intake passage. The throttle valve 22 changes the cross-sectional area of the intake passage by changing its opened degree according to a control command from a control device which is not illustrated in the drawings. Accordingly, the amount of air supplied to the intake manifold 23 can be adjusted.

The intake manifold 23 is connected to the downstream end part of the intake pipe 21 in the direction of the intake flow. The intake manifold 23 distributes the air supplied via the intake pipe 21 according to the number of cylinders 30 and supplies the air to the combustion chambers 31 formed in the cylinders 30, respectively.

The power generation unit 3 is configured with multiple (four in the present embodiment) cylinders 30. The power generation unit 3 generates power to reciprocate the pistons by burning fuel in the combustion chambers 31 formed in the respective cylinders 30.

Specifically, in each combustion chamber 31, the air supplied from the intake manifold 23 is compressed, and then the fuel supplied from a fuel supply unit, which is not illustrated in the drawings, is injected. Accordingly, combustion occurs in the combustion chambers 31, so that the pistons can be reciprocated up and down. The power thereby obtained is transmitted to an appropriate device on the downstream side of the power via the crankshaft 10, etc.

As illustrated in FIG. 2, the turbocharger 24 includes the turbine 25, the shaft 26, and the compressor 27. The compressor 27 is connected to the turbine 25 via the shaft 26. In this way, the compressor 27 rotates with the rotation of the turbine 25 which rotates by use of the exhaust gas discharged from the combustion chambers 31, so that the air purified by an air cleaner, which is not illustrated in the drawings, is compressed and forcibly taken in.

The exhaust unit 4 discharges the exhaust gas generated in the combustion chambers 31 to the outside. The exhaust unit 4 includes the exhaust pipe 41, the exhaust manifold 42, and the ATD (exhaust gas purification device) 43. ATD is an abbreviation for After Treatment Device.

The exhaust pipe 41 configures an exhaust gas passage, and the exhaust gas discharged from the combustion chambers 31 can flow to the inside thereof. The exhaust pipe 41 includes the turbocharger introduction pipe 51, the connection pipe 52, and the discharge pipe 53.

The exhaust manifold 42 is connected to the upstream end part of the exhaust pipe 41 in the direction of the exhaust gas flow. The exhaust manifold 42 collectively guides the exhaust gas generated in each combustion chamber 31 to the exhaust pipe 41 (specifically, the turbocharger introduction pipe 51).

As illustrated in FIG. 1, the exhaust manifold 42 is mounted on a lateral surface of the cylinder head 13 which is formed in an approximately rectangular parallelepiped shape. Hereinafter, the side on which the exhaust manifold 42 is mounted on the engine body 1 may be referred to as an exhaust side. On the other hand, with respect to the lateral surfaces of the cylinder head 13, the above-described intake manifold 23 is mounted on the surface on the opposite side of the exhaust manifold 42. Hereinafter, the side on which the intake manifold 23 is mounted on the engine body 1 may be referred to as an intake side. The exhaust side and the intake side face each other in the width direction of the engine 100.

The exhaust gas of the exhaust manifold 42 passes through the turbocharger introduction pipe 51 and flows to the turbocharger 24. After driving the turbine 25 of the turbocharger 24, the exhaust gas passes through the connection pipe 52 and flows to the ATD 43.

The ATD 43 is a device that performs post-treatment of exhaust gas. The ATD 43 is arranged in the middle part of the exhaust pipe 41. The ATD 43 purifies the exhaust gas by removing harmful components such as NOx (nitrogen oxides), CO (carbon monoxide), HC (hydrocarbons) and particulate matter contained in the exhaust gas.

The ATD 43 includes the DPF device 44 and the SCR device 45. DPF is an abbreviation for Diesel Particulate Filter. SCR is an abbreviation for Selective Catalytic Reduction.

The DPF device 44 removes carbon monoxide, nitric oxide, particulate matter and the like contained in the exhaust gas via an oxidation catalyst and a filter, which are not illustrated in the drawings but housed in the DPF case 44a illustrated in FIG. 1, etc. The oxidation catalyst is a catalyst configured with platinum, etc., and for oxidizing (combusting) unburned fuel, carbon monoxide, nitric oxide and the like contained in the exhaust gas. The filter is arranged on the downstream side of the exhaust gas relative to the oxidation catalyst and is configured as, for example, a fall flow type filter. The filter collects particulate matter contained in the exhaust gas treated with the oxidation catalyst.

Figure 3:
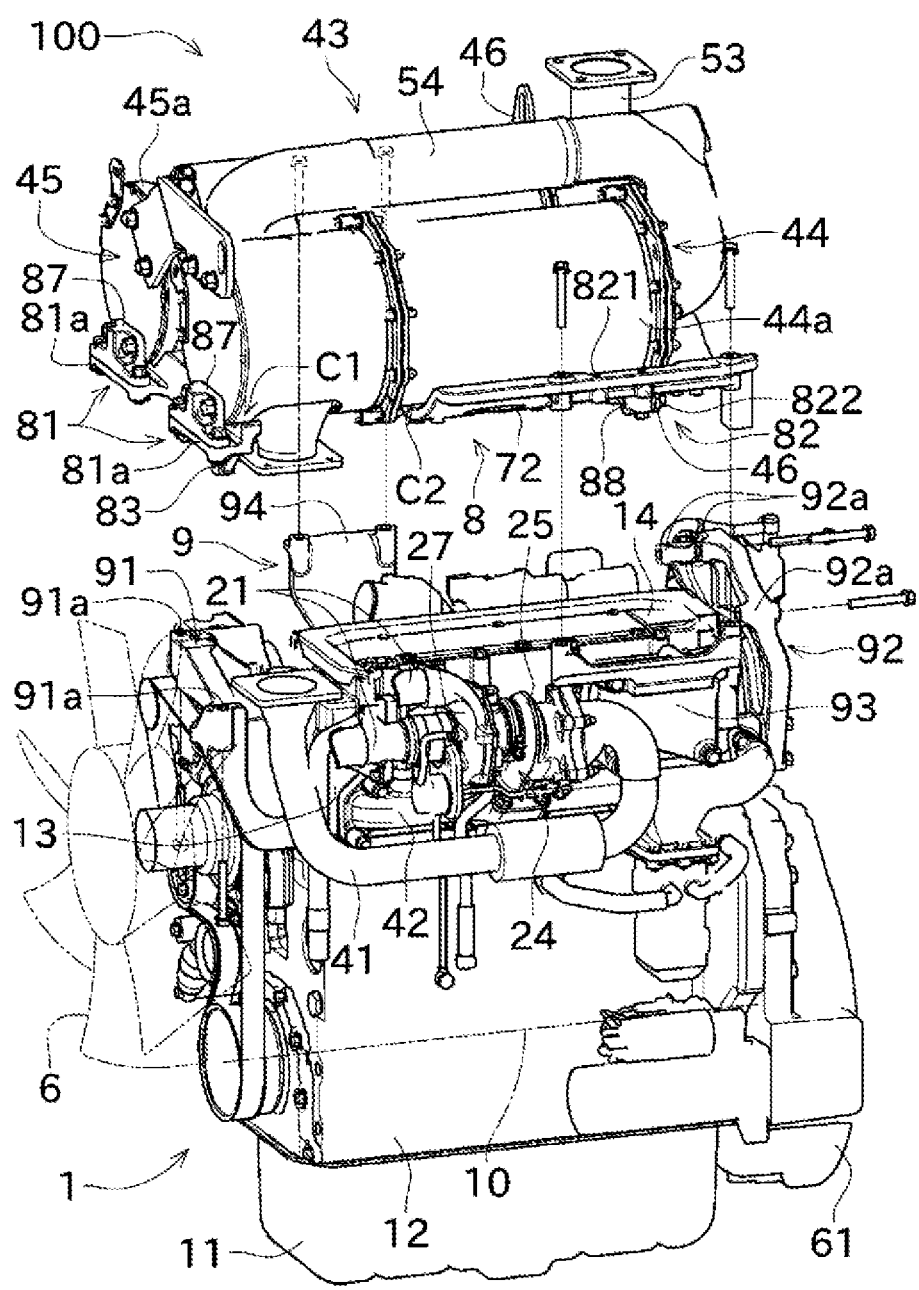
FIG. 3 is an exploded perspective view illustrating how an ATD and a support base are mounted on an engine body.

As illustrated in FIG. 1 and FIG. 3, the DPF case 44a is configured with an elongated approximately cylindrical hollow member. The DPF case 44a is mounted on the upper side of the engine body 1 so that the longitudinal direction thereof is parallel to the longitudinal direction of the engine 100. The DPF case 44a is arranged on the exhaust side (the side where the turbocharger 24 and the exhaust manifold 42 are located) relative to the SCR case 45a, which will be described later, in the width direction of the engine 100.

Inside the DPF device 44, the exhaust gas flows from the side closer to the cooling fan 6 toward the side closer to the flywheel housing 61. The exhaust gas that has passed through the DPF device 44 flows into the connecting pipe 54. The connecting pipe 54 has a linear section arranged approximately parallel to the DPF device 44 and the SCR device 45. In the connecting pipe 54, exhaust gas flows from the side closer to the flywheel housing 61 toward the side closer to the cooling fan 6. The exhaust gas is mixed with urea that is supplied from a urea supply device, which is not illustrated in the drawings, in the connecting pipe 54. Thereafter, the exhaust gas flows from the connecting pipe 54 to the SCR device 45.

The SCR device 45 removes NOx contained in the exhaust gas via a slip catalyst and an SCR catalyst housed in the SCR case 45a illustrated in FIG. 1, etc. The SCR catalyst is configured with a material such as ceramic that adsorbs ammonia. NOx contained in the exhaust gas is reduced by contact with the SCR catalyst adsorbing ammonia and changed into nitrogen and water. The slip catalyst is used for preventing ammonia from being released to the outside. The slip catalyst is a catalyst such as platinum that oxidizes ammonia so as to change ammonia into nitrogen and water by oxidization.

As illustrated in FIG. 1, the SCR case 45a is configured with an elongated approximately cylindrical hollow member as with the DPF case 44a. The SCR case 45a is mounted on the upper side of the engine body 1 so that the longitudinal direction thereof is parallel to the longitudinal direction of the engine 100. The SCR case 45a is mounted on the intake side relative to the DPF case 44a in the width direction of the engine 100. That is, the DPF case 44a and the SCR case 45a are mounted side by side in the width direction of the engine 100.

Inside the SCR device 45, the exhaust gas flows from the side closer to the cooling fan 6 toward the side closer to the flywheel housing 61. The exhaust gas that has passed through the SCR device 45 is discharged to the outside via the discharge pipe 53 connected to the exhaust gas outlet of the SCR case 45a.

Subsequently, the support structure for supporting the ATD 43 (that is, the DPF case 44a and the SCR case 45a) above the engine body 1 will be explained with reference to FIG. 3, etc. FIG. 3 is an exploded perspective view illustrating the configuration of the engine 100.

Note that, in the following, "front" means the side closer to the cooling fan 6 in the longitudinal direction of the engine 100, and "rear" means the side closer to the flywheel housing 61 in the longitudinal direction of the engine 100. However, the names of these orientations are for convenience and do not limit the orientation, etc., in which the engine 100 is mounted on machines.

In the engine 100 of the present embodiment, the support mechanism for supporting the ATD 43 above the engine body 1 is configured with the support base 8 and the support bracket 9 as illustrated in FIG. 1 and FIG. 3. Specifically, as illustrated in FIG. 3, in a state of being placed on the support base 8, the ATD 43 (that is, the DPF case 44a and the SCR case 45a) is mounted on the engine body 1 via the support bracket 9.

Figure 4:
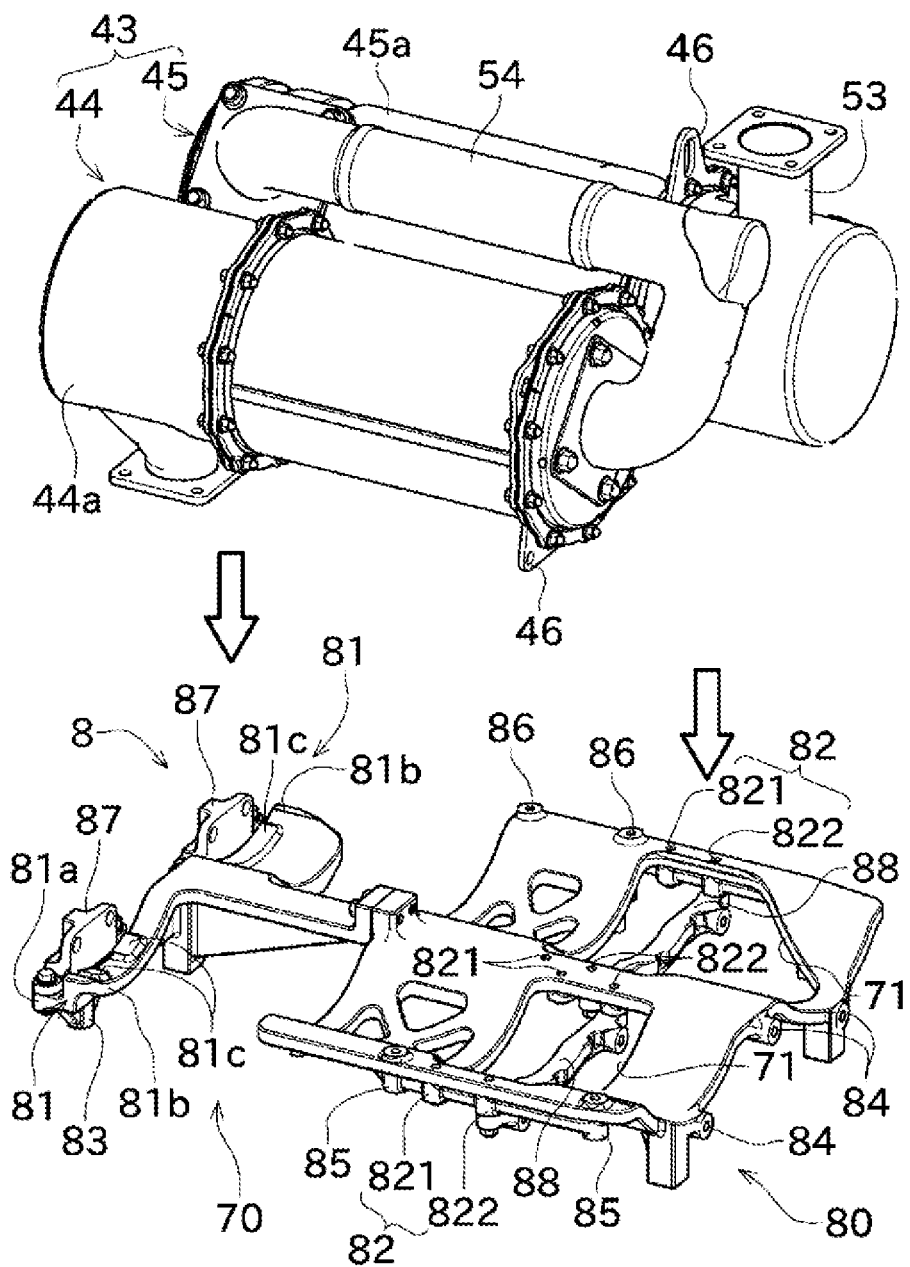
FIG. 4 is an exploded perspective view illustrating the ATD and the support base.

As illustrated in FIG. 4, the support base 8 is configured with an approximately plate-shaped casting. In the support base 8, the section facing the lower part of the DPF case 44a and the lower part of the SCR case 45a is formed in a curved shape along the outer peripheral surfaces of the DPF case 44a and the SCR case 45a. In other words, when viewed in an orientation along the longitudinal direction of the engine 100, the support base 8 is configured with two arcuate plates arranged in the width direction.

The support base 8 has an elongated shape in a plan view. As illustrated in FIG. 1 and FIG. 3, the support base 8 is supported in a location above the engine body 1 (specifically, the head cover 14) so that the thickness direction thereof is aligned with the height direction of the engine 100, the longitudinal direction thereof is aligned with the longitudinal direction of the engine 100, and the width direction thereof is aligned with the width direction of the engine 100.

As illustrated in FIG. 4, the support base 8 is configured by mounting the first support part 70 and the second support part 80 side by side in the longitudinal direction. The first support part 70 is arranged on the front side, and the second support part 80 is arranged on the rear side. Note that the support base 8 is not limited as such and may be integrally formed.

As illustrated in FIG. 4, etc., the first support part 70 is formed in an approximately T shape in a plan view. The first support part 70 is formed with the case-front-side mounting part 81 and the front-end bracket mounting part 83. The front ends of the DPF case 44a and the SCR case 45a are mounted on the case-front-side mounting part 81. The support bracket 9 is mounted on the front-end bracket mounting part 83.

The second support part 80 is formed in an approximately rectangular shape in a plan view. The case-rear-side mounting part 82 is formed on the second support part 80. The rear ends of the DPF case 44a and the SCR case 45a are mounted on the case-rear-side mounting part 82.

Further, the second support part 80 is formed with the rear-end bracket mounting part 84, the exhaust-side bracket mounting part 85, and the intake-side bracket mounting part 86. The support bracket 9 is mounted on each of the rear-end bracket mounting part 84, the exhaust-side bracket mounting part 85, and the intake-side bracket mounting part 86.

Two case-front-side mounting parts 81 are formed side by side in the width direction of the support base 8. The same applies to the case-rear-side mounting parts 82. The DPF case 44a is mounted on the case-front-side mounting part 81 and the case-rear-side mounting part 82 on one side of the width direction. The SCR case 45a is mounted on the case-front-side mounting part 81 and the case-rear-side mounting part 82 on the other side of the width direction.

The configurations of the two case-front-side mounting parts 81 are substantially the same as each other. Further, the configurations of the two case-rear-side mounting parts 82 are substantially the same as each other. Hereinafter, the case-front-side mounting part 81 and the case-rear-side mounting part 82 located on one side (specifically, the DPF case 44a side) of the width direction of the support base 8 will be explained as representatives.

As illustrated in FIG. 4 through FIG. 7, the case-front-side mounting part 81 is formed with the auxiliary member mounting part 81a and the case support part 81b.

Figure 6:
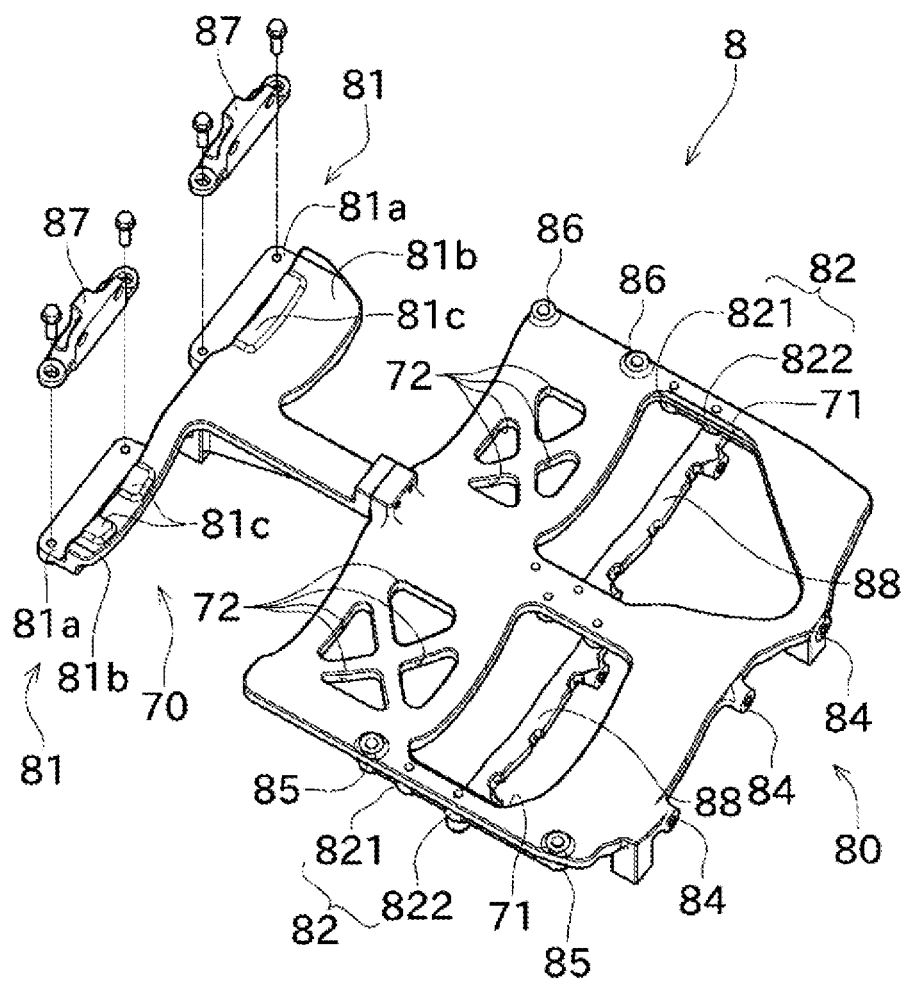
FIG. 6 is an exploded perspective view illustrating how a first auxiliary member is mounted on the support base.

As illustrated in FIG. 6, the auxiliary member mounting part 81a is formed in a flat plate shape that projects further forward from the front end of the support base 8 (first support part 70). The first auxiliary member 87 is mounted on this auxiliary member mounting part 81a via bolts or the like.

Figure 5:
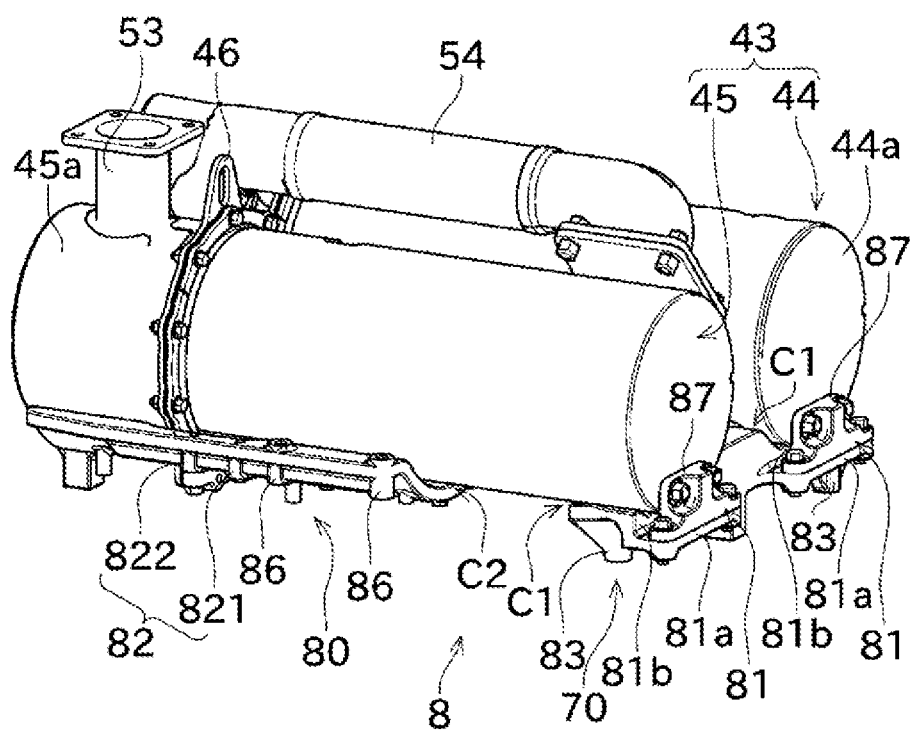
FIG. 5 is a perspective view illustrating the ATD and the support base.

The first auxiliary member 87 is formed in a block shape as illustrated in FIG. 5, FIG. 6, etc. As illustrated in FIG. 6, in a state of being placed on the upper surface of the auxiliary member mounting part 81a, the first auxiliary member 87 is mounted on the auxiliary member mounting part 81a via bolts or the like that are inserted in the vertical direction. Accordingly, as illustrated in FIG. 4, the first auxiliary member 87 is arranged so as to project upward relative to the auxiliary member mounting part 81a.

This first auxiliary member 87 is used for fixing the front end of the DPF case 44a. Specifically, as illustrated in FIG. 4 and FIG. 5, in a state of abutting on the first auxiliary member 87, the front end of the DPF case 44a is mounted on the first auxiliary member 87 via bolts or the like that are inserted in the longitudinal direction of the engine 100. In this way, the front end of the DPF case 44a is fixed to the first auxiliary member 87.

The case support part 81b is located at the front end of the first support part 70. The support protrusion 81c that comes into contact with the outer peripheral surface of the DPF case 44a and supports the DPF case 44a is formed on the upper surface of the case support part 81b. It is possible that this support protrusion 81c is formed with multiple (two in the present embodiment) protrusions as illustrated on the lower side of FIG. 6, and it is also possible that this support protrusion 81c is configured with one protrusion that is elongated and continuous in the width direction as illustrated on the upper side of FIG. 6.

Via this support protrusion 81c, the front end of the DPF case 44a is mounted on the above-described first auxiliary member 87 without contacting the upper surface of the case support part 81b (and thus the support base 8). In other words, as illustrated in FIG. 5, the gap C1 is formed between the lower surface of the front end of the DPF case 44a and the upper surface of the first support part 70.

As illustrated in FIG. 6, etc., the case-rear-side mounting part 82 is formed in the middle part of the second support part 80 in the longitudinal direction of the support base 8. The case-rear-side mounting part 82 includes the first case mounting part (fixing part) 821 and the second case mounting part (fixing part) 822. The first case mounting part 821 and the second case mounting part 822 are arranged side by side in the longitudinal direction of the support base 8.

The first case mounting part 821 and the second case mounting part 822 have substantially the same configuration. Each of the first case mounting part 821 and the second case mounting part 822 is configured with, for example, a pair of mounting bosses arranged at an appropriate interval in the width direction of the support base 8. A mounting hole is formed in each of the mounting bosses in the vertical direction. The interval of the mounting holes can be determined, for example, in consideration of the outer diameters of the DPF case 44a and the SCR case 45a.

Note that the configurations of the first case mounting part 821 and the second case mounting part 822 are not limited as described above, and it is possible to be configured with another structure capable of fixing the second auxiliary member 88 which is described later, and it is also possible to be formed integrally with the second auxiliary member 88.

The first case mounting part 821 is disposed in front of the second case mounting part 822 (on the cooling fan 6 side). The first case mounting part 821 is used in a case where the DPF case 44a having a relatively short length is mounted.

The second case mounting part 822 is disposed behind the first case mounting part 821 (on the flywheel housing 61 side). The second case mounting part 822 is used in a case where the DPF case 44a having a relatively long length is mounted.

As a place on which the second auxiliary member 88 is mounted, either one of the first case mounting part 821 and the second case mounting part 822 is selected. Accordingly, the support base 8 is capable of corresponding to each of the DPF cases 44a having different lengths according to the specifications. That is, the common support base 8 can be used for each of the DPF cases 44a of different specifications.

Figure 7:
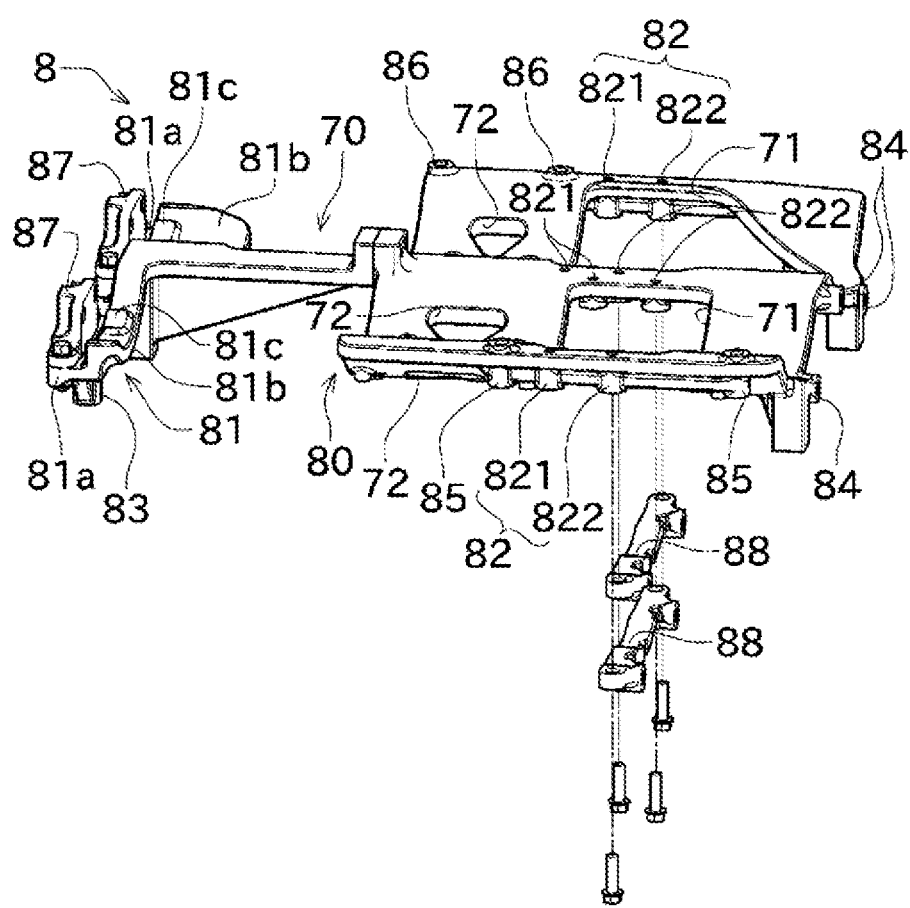
FIG. 7 is an exploded perspective view illustrating how a second auxiliary member is mounted on the support base.

In the explanation regarding the mounting of the DPF case 44a below, the case where the second case mounting part 822 is used will be explained as a representative. In FIG. 7, how the second auxiliary member 88 is mounted on the second case mounting part 822 is illustrated.

As illustrated in FIG. 4, etc., the rear end part of the DPF case 44a is mounted on the case-rear-side mounting part 82 (second case mounting part 822) via the second auxiliary member (mounting member) 88.

Figure 8:
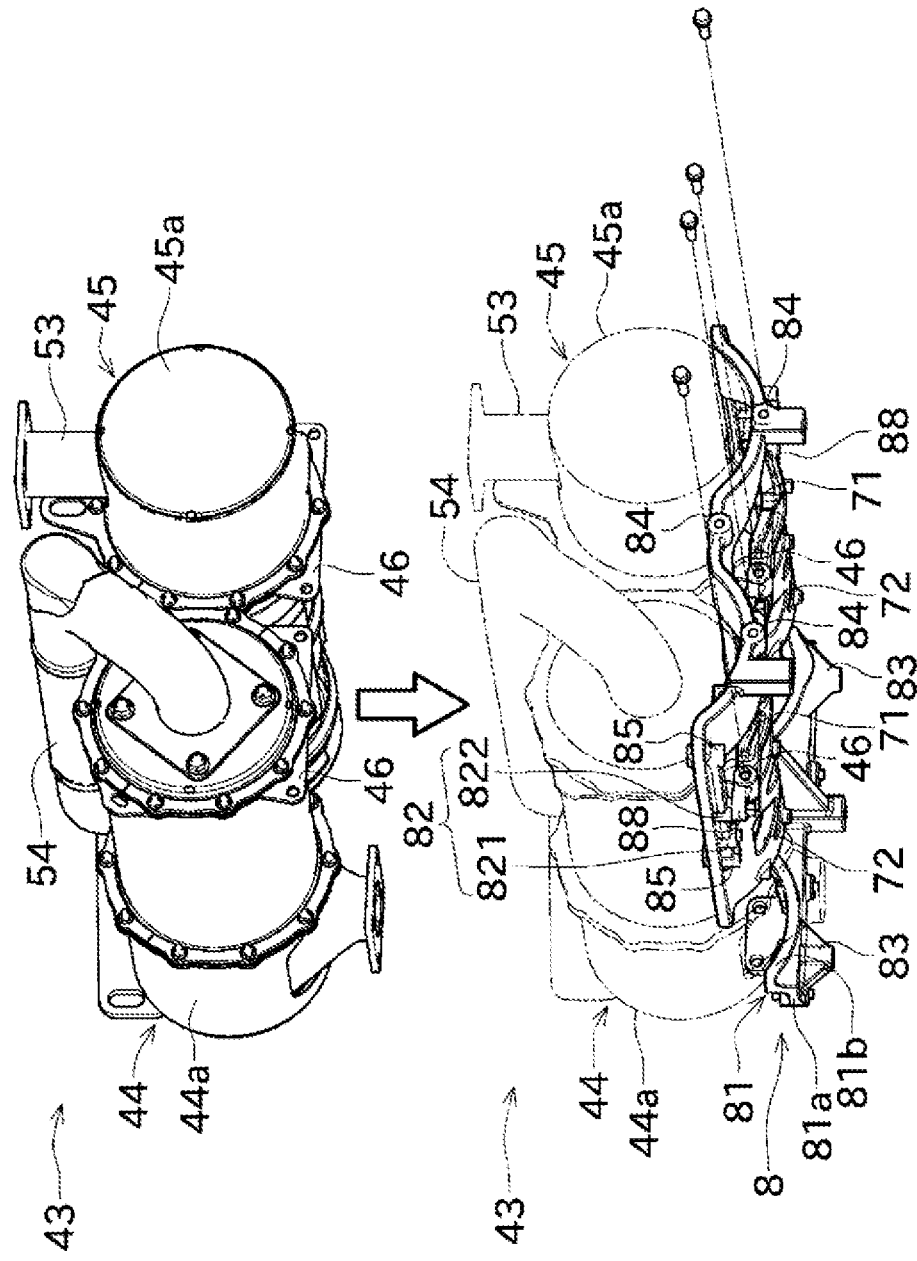
FIG. 8 is a perspective view illustrating how the ATD is mounted on the support base.

Next, the configuration for mounting the DPF case 44a on the second case mounting part 822 will be briefly explained with reference to FIG. 8, etc. FIG. 8 is a perspective view illustrating how the ATD 43 is mounted on the support base 8.

As illustrated in FIG. 8, the flange part 46 extending further outward in the radial direction from the outer peripheral surface is formed at the rear end of the DPF case 44a (rear side of the SCR case 45a). This flange part 46 is used to be mounted on the second case mounting part 822.

The flange part 46 can be formed, for example, by mounting a member in an approximately annular shape formed of a plate member onto the outer periphery of the DPF case 44a. However, the flange part 46 is not limited as such and, for example, may be configured to extend further downward from the outer peripheral surface (that is, a part of the outer peripheral surface) on the lower side of the DPF case 44a.

The second support part 80 of the support base 8 is formed with an opening 71 through which the flange part 46 is allowed to pass. As illustrated in FIG. 6, etc., the opening 71 is formed between the pairs of mounting holes constituting the first case mounting part 821 and the second case mounting part 822 so as to penetrate the support base 8 in the thickness direction.

As illustrated in FIG. 8, in a state where the DPF case 44a is placed on the support base 8, the flange part 46 passes through the opening 71 and is exposed from below the support base 8.

As illustrated in FIG. 7, etc., the second auxiliary member 88 is formed in an elongated block shape. The second auxiliary member 88 is fixed to the case-rear-side mounting part 82 (second case mounting part 822) so that the longitudinal direction thereof is aligned with the width direction of the engine 100.

Both end parts of the second auxiliary member 88 in the longitudinal direction are mounted on the case-rear-side mounting part 82 (in the example of FIG. 7, the second case mounting part 822) via bolts or the like that are inserted in the vertical direction.

Mounting holes for mounting the DPF case 44a (specifically, the flange part 46) are formed at the rear end of the second auxiliary member 88. The mounting holes are open so as to face the longitudinal direction of the engine 100.

In a state where the DPF case 44a is placed on the support base 8, as illustrated in FIG. 8, the flange part 46 of the DPF case 44a is in contact with the rear-side surface (the part in which the mounting holes are formed) of the second auxiliary member 88. In this state, the flange part 46 is mounted on the second auxiliary member 88 via bolts or the like that are inserted in the longitudinal direction of the engine 100. In this way, the rear end of the DPF case 44a is fixed to the support base 8 via the second auxiliary member 88.

In the engine 100 of the present embodiment, the positions of the bolt holes formed in the flange part 46 are determined so that, in a state where the flange part 46 is mounted on the second auxiliary member 88, the gap C2 of FIG. 5 is formed between the DPF case 44a and the second support part 80.

With this configuration, as illustrated in FIG. 5, in a case where the DPF case 44a is placed on the support base 8, only a part of the front end of the DPF case 44a comes into direct contact with the support base 8 (support protrusion 81c). That is, the DPF case 44a is supported in a state of being almost floating above the support base 8. As a result, the air (wind) generated by the rotating cooling fan 6 can flow through the gaps C1 and C2 between the outer peripheral surface of the DPF case 44a and the upper surface of the support base 8. As a result, the heat dissipation effect of the ATD 43 is preferable.

Further, as illustrated in FIG. 6, multiple ventilation window sections 72 (eight in the present embodiment) are formed in the second support part 80 of the support base 8 in the present embodiment. These ventilation window sections 72 are formed so as to penetrate the support base 8 in the thickness direction. Thereby, the heat dissipation effect of the ATD 43 can be further enhanced.

The support base 8 of the present embodiment has a configuration in which multiple triangular ventilation window sections 72 are arranged side by side. However, the shape and number of the ventilation window sections 72 are not particularly limited. For example, it is also possible that slit-shaped ventilation window sections are formed.

As illustrated in FIG. 8, etc., the front-end bracket mounting part 83 is formed at the front end of the support base 8 so as to project further downward from the lower-side surface of the support base 8. Multiple (two in the present embodiment) front-end bracket mounting parts 83 are formed at a predetermined interval in the width direction of the support base 8. It is also possible that the front-end bracket mounting parts 83 are formed, for example, in an approximately tubular shape or an approximately funnel shape, that is, the shape thereof is not particularly limited.

Figure 9:
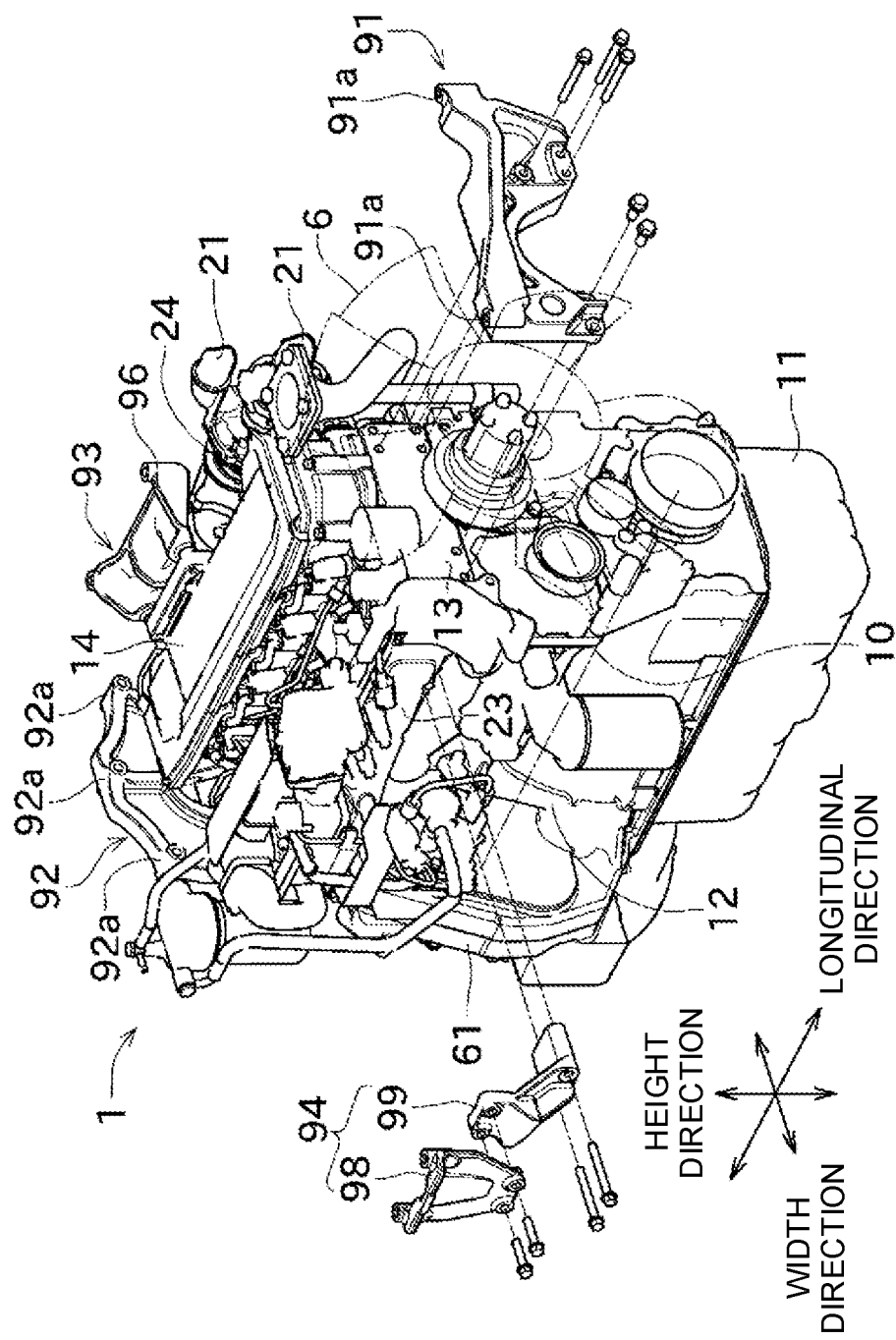
FIG. 9 is an exploded perspective view illustrating how a front-side support bracket and an intake-side support bracket are mounted on the engine body.

Mounting holes for inserting bolts or the like from below are formed on the lower surfaces of the front-end bracket mounting parts 83. As illustrated in FIG. 9, these mounting holes are formed so as to correspond to the positions of the vertically-mounted bosses 91*a* formed in the front-side support bracket 91, which will be described later.

Note that the front-end bracket mounting part 83 is not limited to the above-described configuration, and, for example, it is also possible to be configured with a through hole that penetrates the support base 8 in the vertical direction or configured with another mounting structure.

As illustrated in FIG. 4 and FIG. 8, the rear-end bracket mounting part 84 is formed in an approximately tubular shape that projects further rearward at the rear end of the support base 8. Multiple (three in the present embodiment) rear-end bracket mounting parts 84 are formed at a predetermined interval in the width direction of the support base.

Figure 10:
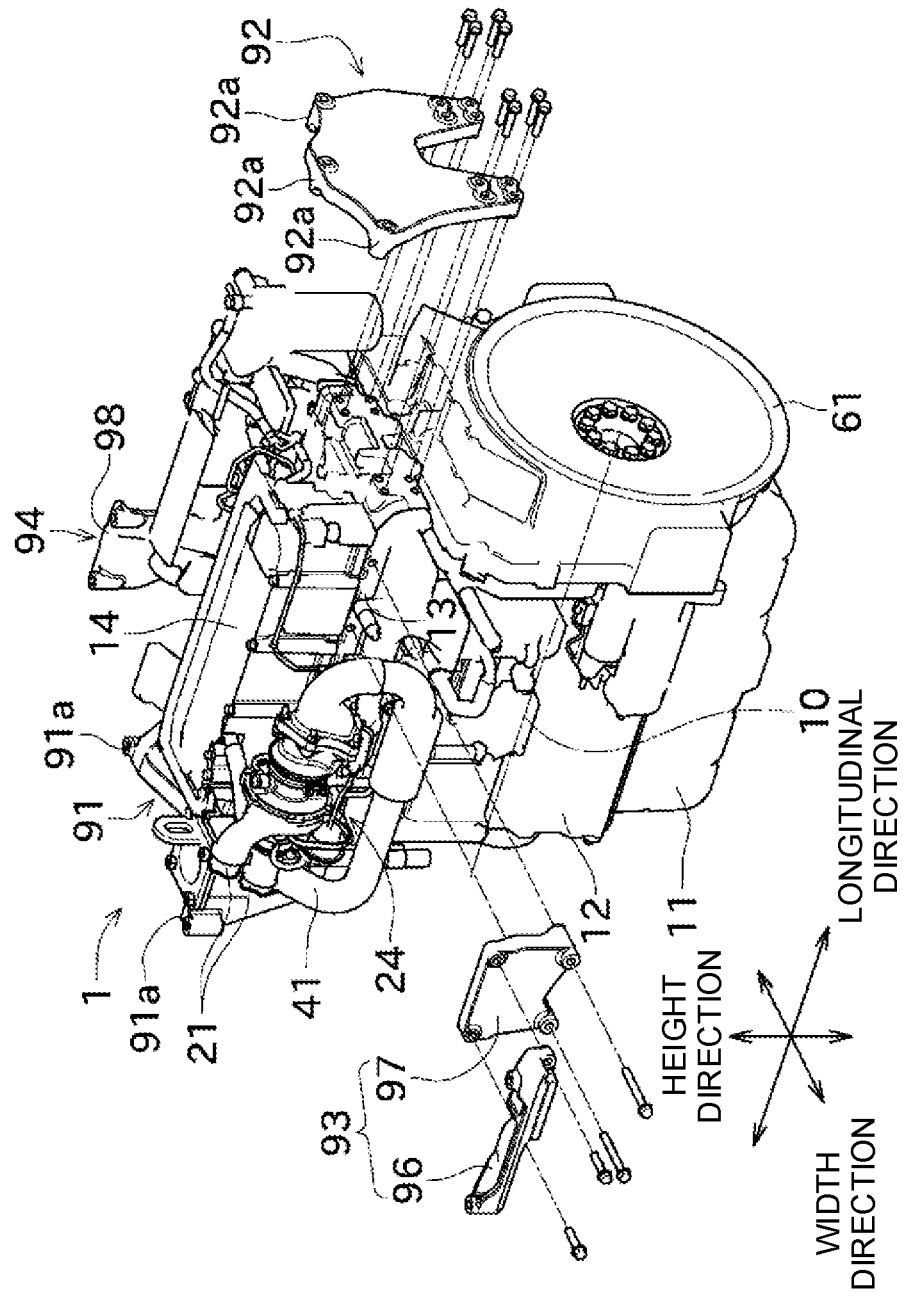
FIG. 10 is an exploded perspective view illustrating how a rear-side support bracket and an exhaust-side support bracket are mounted on the engine body.

The rear-end bracket mounting part 84 is formed with mounting holes for inserting bolts or the like from the rear side in the horizontal direction. As illustrated in FIG. 10, these mounting holes are formed so as to correspond to the positions of the horizontal holes of the horizontally-mounted bosses 92*a* that are formed in the rear-side support bracket 92, which will be described later.

In the width direction of the support base 8, the exhaust-side bracket mounting parts 85 are arranged at the end part of the support base 8 on the side where the DPF case 44*a* is mounted. The exhaust-side bracket mounting parts 85 are formed in an approximately tubular shape that projects further downward from the lower-side surface of the support base 8. Multiple (two in the present embodiment) exhaust-side bracket mounting parts 85 are formed at a predetermined interval in the longitudinal direction of the support base 8.

The exhaust-side bracket mounting parts 85 are formed with mounting holes for inserting bolts or the like from above. As illustrated in FIG. 10, these mounting holes are formed so as to correspond to the positions of the mounting holes formed in the exhaust-side support bracket 93, which will be described later.

In the width direction of the support base 8, the intake-side bracket mounting parts 86 are arranged at the end part of the support base 8 on the side where the SCR case 45*a* is mounted. As with the exhaust-side bracket mounting parts 85, the intake-side bracket mounting parts 86 are formed in an approximately tubular shape that protrudes further downward from the lower-side surface of the support base 8. Multiple (two in the present embodiment) intake-side bracket mounting parts 86 are formed at a predetermined interval in the longitudinal direction of the support base 8.

The mounting holes for inserting bolts or the like from above are formed on the lower surfaces of the intake-side bracket mounting parts 86. As illustrated in FIG. 9, these mounting holes are formed so as to correspond to the positions of the mounting holes formed in the intake-side support bracket 94, which will be described later.

It is preferable that the exhaust-side bracket mounting parts 85 and the intake-side bracket mounting parts 86 are formed at such positions so as not to be symmetrical with each other in the width direction of the support base 8. That is, it is preferable that the exhaust-side bracket mounting parts 85 and the intake-side bracket mounting parts 86 are arranged at different positions in the longitudinal direction of the support base 8.

In the present embodiment, the exhaust-side bracket mounting parts 85 are formed on a slightly rear side of the support base 8 in the longitudinal direction, and the intake-side bracket mounting parts 86 are formed on a slightly forward side of the support base 8 in the longitudinal direction.

Accordingly, when the support base 8 is supported via the exhaust-side support bracket 93 and the intake-side support bracket 94, which will be described later, even in a case where each of the exhaust-side support bracket 93 and the intake-side support bracket 94 is small, the support base 8 (and thus the ATD 43) can be supported in a well-balanced and stable manner.

The positions of the respective mounting parts (places where the bolts are inserted) described above can be appropriately set so that the support base 8 can be preferably supported. The predetermined interval of the front-end bracket mounting parts 83, the predetermined interval of the rear-end bracket mounting parts 84, the predetermined interval of the exhaust-side bracket mounting parts 85, and the predetermined interval of the intake-side bracket mounting parts 86 can be set to the same value or to values that are different from each other.

Subsequently, the support bracket 9 for mounting the support base 8 onto the engine body 1 will be explained with reference to FIG. 9 and FIG. 10. FIG. 9 is an exploded perspective view illustrating how the front-side support bracket 91 and the intake-side support bracket 94 are mounted on the engine body 1. FIG. 10 is an exploded perspective view illustrating how the rear-side support bracket 92 and the exhaust-side support bracket 93 are mounted on the engine body 1.

The support bracket 9 includes the front-side support bracket (first support bracket) 91, the rear-side support bracket (second support bracket) 92, the exhaust-side support bracket (third support bracket) 93, and the intake-side support bracket (fourth support bracket) 94. Each of the front-side support bracket 91, the rear-side support bracket 92, the exhaust-side support bracket 93, and the intake-side support bracket 94 is formed of, for example, a casting.

The front-side support bracket 91 is formed in a block shape as illustrated in FIG. 9. The front-side support bracket 91 is mounted on the cooling fan 6 side of the engine body 1 so as to support the support base 8.

Multiple mounting holes for inserting bolts in the longitudinal direction of the engine 100 are formed in the lower part of the front-side support bracket 91. As illustrated in FIG. 9, the front-side support bracket 91 is fixed to the engine body 1 by inserting and mounting bolts or the like in the longitudinal direction of the engine 100 in a state where the formed above-described multiple mounting holes are aligned with the holes that are formed at the corresponding positions in the engine body 1 (for example, the cylinder head 13).

The multiple vertically-mounted bosses (vertically-mounted parts) 91*a* are formed on the upper side of the front-side support bracket 91 in accordance with the positions and number of the front-end bracket mounting parts 83. Each of the vertically-mounted bosses 91*a* is formed with a vertical hole into which a bolt or the like can be inserted in the vertical direction. The upper surfaces of the vertically-mounted bosses 91*a* come into contact with the lower surfaces of the front-end bracket mounting parts 83 of the support base 8 so as to function as position-determining surfaces for determining the position of the support base 8 in the vertical direction.

By inserting and mounting bolts or the like in the vertical direction in a state where each of the vertical holes is aligned with the mounting hole formed in each of the above-described multiple front-end bracket mounting parts 83, the support base 8 is fixed to the front-side support bracket 91.

The rear-side support bracket 92 is formed in a block shape as illustrated in FIG. 10. The rear-side support bracket 92 is mounted on the flywheel housing 61 side of the engine body 1 so as to support the support base 8.

Multiple mounting holes for inserting bolts or the like in the longitudinal direction of the engine 100 are formed on the lower side of the rear-side support bracket 92. As illustrated in FIG. 10, by inserting and mounting bolts or the like in the longitudinal direction of the engine 100 in a state where the formed above-described multiple mounting holes are aligned with the holes formed at the corresponding positions of the engine body 1 (for example, the cylinder head 13), the rear-side support bracket 92 is fixed to the engine body 1.

The multiple horizontally-mounted bosses (horizontally-mounted parts) 92a are formed at the upper end of the rear-side support bracket 92 in accordance with the positions and number of the rear-end bracket mounting parts 84. Each of the horizontally-mounted bosses 92a is formed with a horizontal hole into which a bolt or the like can be inserted in the longitudinal direction of the engine 100. The front surfaces of the horizontally-mounted bosses 92a come into contact with the rear surfaces of the rear-end bracket mounting parts 84 of the support base 8 so as to function as position-determining surfaces for determining the position of the support base 8 in the longitudinal direction.

By inserting and mounting bolts or the like in the horizontal direction in a state where the horizontal holes formed in the horizontally-mounted bosses 92a are aligned with the mounting holes respectively formed in the above-described multiple case-rear-side mounting parts 82, the support base 8 is fixed to the rear-side support bracket 92.

As illustrated in FIG. 10, in the width direction of the engine 100, the exhaust-side support bracket 93 is arranged on the exhaust side where the exhaust manifold 42 is arranged. The exhaust-side support bracket 93 is configured with two components arranged at different heights.

The exhaust-side support bracket 93 includes the support-base-side block (second component) 96 and the engine-body-side block (first component) 97.

As illustrated in FIG. 10, the support-base-side block 96 is arranged above the engine-body-side block 97. At the lower end of the support-base-side block 96, mounting holes for connecting to the engine-body-side block 97 are formed. The mounting holes are formed so that bolts or the like are inserted in the width direction of the engine 100. At the upper end of the support-base-side block 96, mounting holes for mounting on the support base 8 are formed. The mounting holes are formed so that bolts or the like are inserted in the vertical direction.

As illustrated in FIG. 10, the engine-body-side block 97 is arranged below the support-base-side block 96. At the upper end of the engine-body-side block 97, mounting holes for inserting bolts or the like in the width direction of the engine 100 are formed. These mounting holes are used for connecting the engine-body-side block 97 to the support-base-side block 96. At the lower end of the engine-body-side block 97, mounting holes for inserting bolts or the like in the width direction of the engine 100 are formed. These mounting holes are used for mounting the engine-body-side block 97 to the engine body 1 (specifically, the cylinder head 13).

By mounting bolts or the like in a state where the mounting holes formed in the lower end of the support-base-side block 96 are aligned with the mounting holes formed in the upper end of the engine-body-side block 97, the support-base-side block 96 is fixed to the engine-body-side block 97.

In this way, the exhaust-side support bracket 93 is configured to connect the support base 8 to the cylinder head 13. By mounting the exhaust-side support bracket 93 onto the cylinder head 13, which is a large block-shaped component, the support base 8 and the ATD 43 can be stably supported.

As illustrated in FIG. 10, by mounting bolts or the like in a state where the mounting holes formed on the lower side of the engine-body-side block 97 are aligned with the holes formed at the corresponding positions in the engine body 1, the exhaust-side support bracket 93 configured as described above is fixed to the engine body 1.

As illustrated in FIG. 9, in the width direction of the engine 100, the intake-side support bracket 94 is arranged on the intake side where the intake manifold 23 is arranged. The intake-side support bracket 94 is configured with two components arranged at different heights.

The intake-side support bracket 94 includes the upper block (second component) 98 and the lower block (first component) 99.

As illustrated in FIG. 9, the upper block 98 is arranged above the lower block 99. At the lower end of the upper block 98, mounting holes for connecting to the lower block 99 are formed. The mounting holes are formed so that bolts or the like are inserted in the width direction of the engine 100. At the upper end of the upper block 98, mounting holes for mounting on the support base 8 are formed. The mounting holes are formed so that bolts or the like are inserted in the vertical direction.

As illustrated in FIG. 9, the lower block 99 is arranged below the upper block 98. At the upper end of the lower block 99, mounting holes for inserting bolts or the like in the width direction of the engine 100 are formed. These mounting holes are used for connecting the lower block 99 to the upper block 98. At the lower end of the lower block 99, mounting holes for inserting bolts or the like in the width direction of the engine 100 are formed. These mounting holes are used for mounting the lower block 99 onto the engine body 1 (specifically, the cylinder block 12).

By mounting bolts or the like in a state where the mounting holes formed in the lower end of the upper block 98 are aligned with the mounting holes formed in the upper end of the lower block 99, the upper block 98 is fixed to the lower block 99.

In this way, the intake-side support bracket 94 is configured to connect the support base 8 to the cylinder block 12. By mounting the intake-side support bracket 94 onto the cylinder block 12, which is a large block-shaped component, the support base 8 and the ATD 43 can be stably supported.

As illustrated in FIG. 9, by mounting bolts or the like in a state where the mounting holes formed on the lower side of the lower block 99 are aligned with the holes formed at the corresponding positions in the engine body 1 (for example, the cylinder block 12), the intake-side support bracket 94 configured as described above is fixed to the engine body 1.

As described above, the front-side support bracket 91, the rear-side support bracket 92, the exhaust-side support bracket 93, and the intake-side support bracket 94 are mounted on the engine body 1.

As illustrated in FIG. 3, regarding the front-side support bracket 91, the front-end bracket mounting part 83 of the support base 8 is fixed to the front-side support bracket 91 by inserting and mounting bolts or the like in the vertical direction from the lower side.

Regarding the rear-side support bracket 92, the intake-side support bracket 94 of the support base 8 is fixed to the rear-side support bracket 92 by inserting and mounting bolts or the like in the horizontal direction.

Regarding the exhaust-side support bracket 93 and the intake-side support bracket 94, by inserting and mounting bolts or the like in the vertical direction from above, the exhaust-side bracket mounting part 85 and the intake-side bracket mounting part 86 of the support base 8 are fixed to the exhaust-side support bracket 93 and the intake-side support bracket 94, respectively.

In this way, the support base 8 is supported by the engine body 1 in a state of being located above the engine body 1. Further, the elongated ATD 43 is arranged along the longitudinal direction of the engine 100 and is fixed to the support base 8. Accordingly, even if the length of the ATD 43 is changed as described above due to the specification of the engine 100, the length of the engine 100 in the width direction can be shortened. Therefore, the engine 100 of the present embodiment can be made compact in the width direction, and therefore, for example, it is preferable that the engine 100 is applied to a small tractor, etc., in which an engine needs to be housed inside a thin bonnet.

In the engine 100 of the present embodiment, when the support base 8 is mounted on the engine body 1, the front-side support bracket 91 and the rear-side support bracket 92 are mounted on the engine body 1 in advance, and then the support base 8 is mounted on the front-side support bracket 91 and the rear-side support bracket 92. Thereafter, the exhaust-side support bracket 93 and the intake-side support bracket 94 are mounted on the engine body 1 and the support base 8.

In this way, the position of the support base 8 in the vertical direction can be determined with the front-side support bracket 91, and the position of the support base 8 in the longitudinal direction of the engine 100 can be determined with the rear-side support bracket 92. Therefore, when the support base 8 of the ATD 43 is mounted above the engine body 1, the three-dimensional mounting position thereof can be easily and accurately determined. That is, the support base 8 can be easily mounted at an accurate position without the need for a jig or the like for determining the position of the support base 8.

In the present embodiment, the vertically-mounted bosses 91a are arranged on the front-side support bracket 91, not on the rear-side support bracket 92. Therefore, even though the front-side support bracket 91 is located between the cooling fan 6 and the engine body 1 as illustrated in FIG. 3, the cooling fan 6 is less likely to get in the way at the time of work for inserting a bolt for mounting the support base 8 onto the front-side support bracket 91, etc. Therefore, the assemblage workability is preferable.

After the front-side support bracket 91 and the rear-side support bracket 92 are mounted, the exhaust-side support bracket 93 and the intake-side support bracket 94 are mounted. Each of the exhaust-side support bracket 93 and the intake-side support bracket 94 is configured to be separated in the height direction, and therefore appropriate play is formed in the mounting holes for connecting the upper and lower components to each other with bolts. Therefore, the support base 8, whose position is accurately determined with the front-side support bracket 91 and the rear-side support bracket 92, can be supported by the exhaust-side support bracket 93 and the intake-side support bracket 94 without backlash or the like.

Next, the sensor support structure included in the engine 100 of the present embodiment will be explained. This support structure can suppress the influence of the heat of the ATD 43 on the sensors.

This sensor support structure is mainly configured with the sensor support bracket 60 including the spacer 62.

Figure 11:
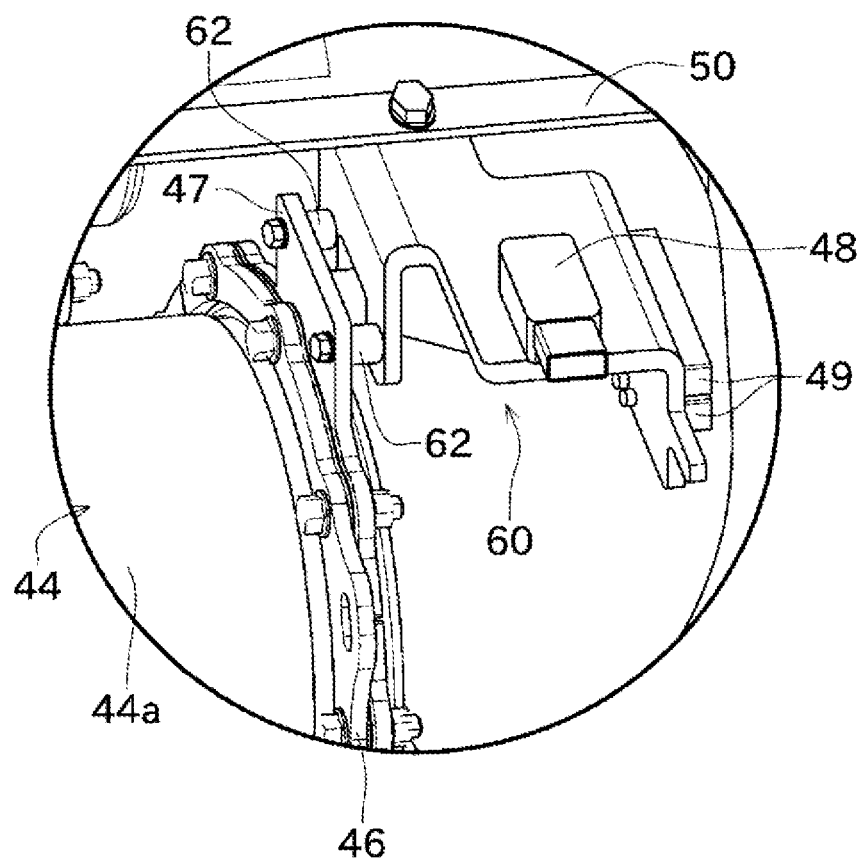
FIG. 11 is a perspective view illustrating a sensor support bracket.
Figure 11:
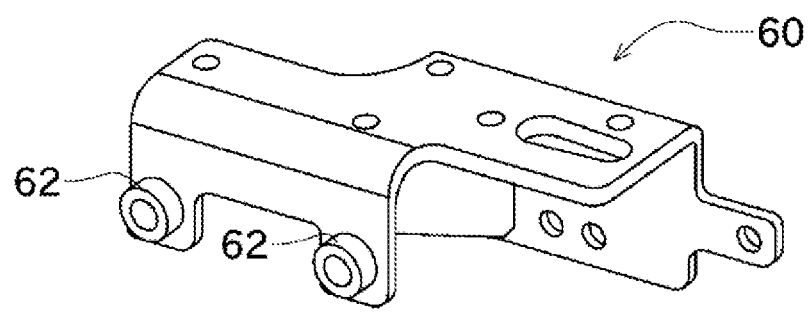

As illustrated in FIG. 11, the sensor support bracket 60 is formed in an approximately gate shape when viewed in the width direction of the engine 100 and is mounted at the end part on the exhaust gas outlet side (flywheel housing 61 side) of the DPF case 44a.

On the upper surface of the sensor support bracket 60, for example, the differential pressure sensor 48 for detecting the pressure difference between the upstream side and the downstream side of the filter included in the DPF device 44 is supported. On the side surface of the sensor support bracket 60 opposite to the DPF case 44a in the longitudinal direction of the engine 100 (DPF device 44), the temperature sensor 49 for detecting the temperature of the ATD 43 is mounted.

On the side surface of the sensor support bracket 60 facing the DPF case 44a in the longitudinal direction of the engine 100 (DPF device 44), the multiple (two in the present embodiment) spacers 62 for arranging the sensor support bracket 60 at a predetermined distance from the DPF case 44a are disposed.

The spacers 62 are arranged side by side in the width direction of the engine 100, for example, and are integrally formed with the sensor support bracket 60 by welding or the like. The spacers 62 are formed in cylindrical shapes, for example, and also function as mounting parts for mounting the sensor support bracket 60 onto the DPF case 44a.

The sensor support bracket 60 is mounted on the stiffener 47 of the DPF case 44a via the spacers 62 and by bolts or the like. One side (for example, the end part on the intake side) of the sensor support bracket 60 in the width direction of the engine 100 is fixed to the frame 50 which is disposed separately from the ATD 43 via a bolt or the like. Accordingly, the sensor support bracket 60 can be mounted in a stable posture.

The stiffener 47 is formed by extending further outward in the radial direction (toward the upper side in the present embodiment) from the outer peripheral surface of the DPF case 44a. The stiffener 47 can be formed, for example, by mounting a flange member formed of a plate member to the outer periphery of the DPF case 44a.

Accordingly, since the sensor support bracket 60 can be mounted at a position away from the outer peripheral surface of the DPF case 44a, it is possible to suppress the influence of radiant heat from the DPF case 44a.

Further, as described above, since the sensor support bracket 60 is mounted on the stiffener 47 via the spacers 62, the area in which the sensor support bracket 60 and the DPF case 44a are directly connected can be limited to the size of the spacers 62. Therefore, it is possible to suppress the heat generated in the DPF case 44a from being directly transferred to the sensor support bracket 60.

That is, with the above-described heat shield support structure, it is possible to avoid heat damage due to heat from the DPF case 44a to the sensors such as the differential pressure sensor 48. The sensors can also be arranged in the vicinity of the ATD 43, and therefore the wiring can be made compact and the degree of freedom in the layout of the sensors can be improved.

As explained above, the engine 100 of the present embodiment has the ATD 43 that purifies exhaust gas. The engine 100 includes the engine body 1, the support base 8, the front-side support bracket 91, and the rear-side support bracket 92. The support base 8 supports the ATD 43. The front-side support bracket 91 is arranged on one side of the engine body 1 and mounted on the engine body 1 so as to support the support base 8. The rear-side support bracket 92 is arranged on the side opposite to the front-side support bracket 91 in relation to the engine body 1 interposed therebetween and mounted on the engine body 1 so as to support the support base 8. The front-side support bracket 91 has the vertically-mounted bosses 91*a* that are arranged on one side of the engine body 1 and mounted on the support base 8 in the vertical direction. The rear-side support bracket 92 has the horizontally-mounted bosses 92*a* that are arranged on the side opposite to the front-side support bracket 91 in relation to the engine body 1 interposed therebetween and mounted on the support base 8 in the horizontal direction.

Accordingly, the ATD 43 can be easily supported above the engine body 1. Further, by supporting the support base 8 from both sides of the engine body 1, the support base 8 can be supported in a stable state. By arranging the vertically-mounted bosses 91*a* and the horizontally-mounted bosses 92*a* respectively on the front-side support bracket 91 and the rear-side support bracket 92, the position of the support base 8 (and thus the ATD 43) can be accurately determined without the need for a jig for position determination. Therefore, the assemblage workability is preferable.

Further, the engine 100 of the present embodiment includes the flywheel and the cooling fan 6. The cooling fan 6 rotates for cooling. The cooling fan 6 and the flywheel are arranged on sides opposite to each other in relation to the engine body 1 interposed therebetween. The front-side support bracket 91 is arranged on the cooling fan 6 side. The rear-side support bracket 92 is arranged on the flywheel side.

Accordingly, since the support base 8 is mounted on the front-side support bracket 91 in the vertical direction, the cooling fan 6 is less likely to get in the way at the time of work for inserting and mounting a bolt. Therefore, the support base 8 can be easily fixed to the front-side support bracket 91 which is fixed to the engine body 1.

Further, the engine 100 of the present embodiment includes the exhaust-side support bracket 93 and the intake-side support bracket 94. The exhaust-side support bracket 93 is arranged on a side (exhaust side) of the engine body 1 that is different from both of the side on which the front-side support bracket 91 is arranged and the side on which the rear-side support bracket 92 is arranged. The intake-side support bracket 94 is arranged on the side (intake side) opposite to the exhaust-side support bracket 93 in relation to the engine body 1 interposed therebetween. The exhaust-side support bracket 93 is configured with the support-base-side block 96 and the engine-body-side block 97 arranged in a direction in which the engine body 1 and the support base 8 are connected. The intake-side support bracket 94 is configured with the upper block 98 and the lower block 99 arranged in a direction in which the engine body 1 and the support base 8 are connected.

Accordingly, the support base 8 can be supported on the four sides, so that more stable support can be realized. Further, since the exhaust-side support bracket 93 and the intake-side support bracket 94 are configured so that positional change of each component is allowed, the support base 8 can be preferably supported while the position of the support base 8 can be determined with the front-side support bracket 91 and the rear-side support bracket 92.

Further, the engine 100 of the present embodiment includes the second auxiliary member 88. The second auxiliary member 88 is used for mounting the ATD 43 onto the support base 8. The support base 8 is equipped with the first case mounting part 821 and the second case mounting part 822 to which the second auxiliary member 88 can be fixed.

Accordingly, since the mounting position of the ATD 43 onto the support base 8 can be changed stepwise, the common support base 8 can be used for ATDs 43 of multiple specifications. As a result, the manufacturing cost can be reduced, and the labor of components management can be reduced.

Figure 12:
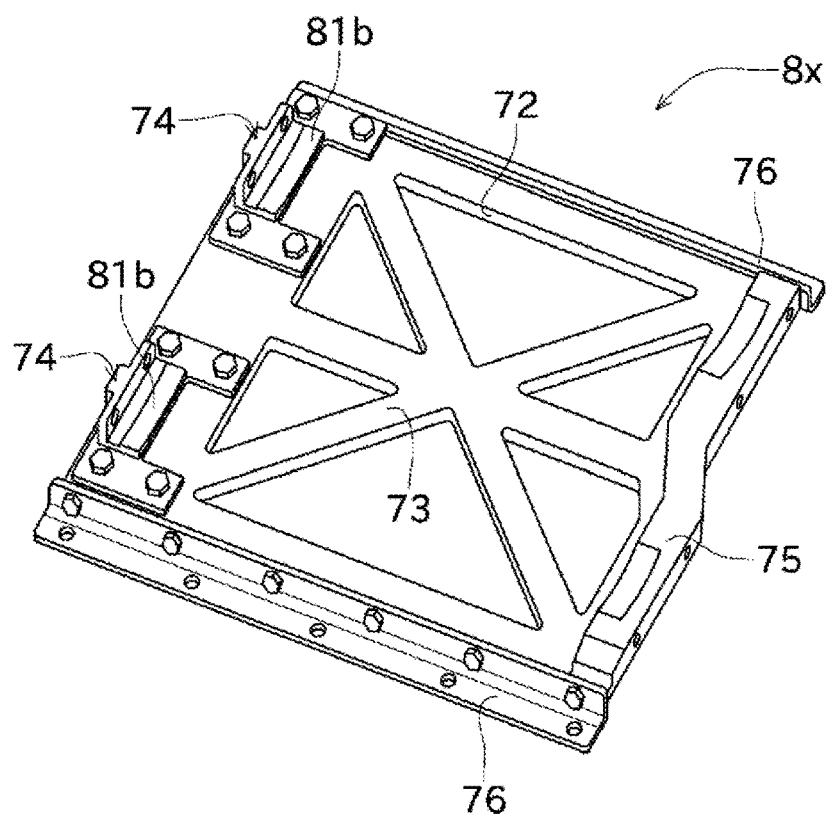
FIG. 12 is a perspective view illustrating a configuration of a support base of a modified example.
Figure 13:
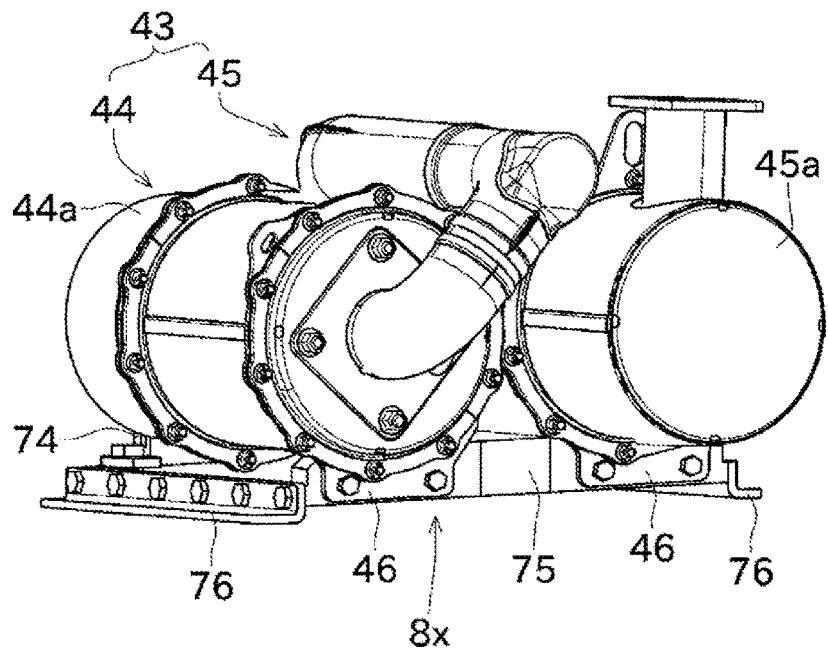
FIG. 13 is a perspective view illustrating how the ATD is mounted on the support base of the modified example.

Next, the support base 8*x* of a modified example will be explained with reference to FIG. 12 and FIG. 13. FIG. 12 is a perspective view illustrating the configuration of the support base 8*x* of the modified example. FIG. 13 is a perspective view illustrating how the ATD 43 is mounted on the support base 8*x* of the modified example. Note that, in the explanation of the present modified example, the same or similar parts and materials as those of the aforementioned embodiment are marked with the same sign in the drawings and may be omitted from the explanation.

As illustrated in FIG. 12, the support base 8*x* of the modified example is configured with the main body part 73, the front auxiliary member 74, the rear protrusion part 75, and the side mounting part 76.

The main body part 73 is made of an approximately plate-shaped casting and is formed as a rectangle (square) in a plan view. The multiple ventilation window sections 72 are formed in the middle part of the main body part 73. The front auxiliary member 74 is mounted on the front of the main body part 73 (on the cooling fan 6 side of the engine 100) via bolts or the like.

The front auxiliary member 74 is formed in a block shape which is approximately the same as the first auxiliary member 87 of the above-described embodiment. The front auxiliary member 74 is used for fixing the front end of the DPF case 44*a* (SCR case 45*a*). Specifically, as with the above-described first auxiliary member 87, in a state of abutting on the front auxiliary member 74, the front end of the DPF case 44*a* (SCR case 45*a*) is mounted on the front auxiliary member 74 via bolts or the like which are inserted in the longitudinal direction of the DPF case 44*a* (SCR case 45*a*).

The front auxiliary member 74 is formed with the case support part 81*b* of the above-described embodiment. When the DPF case 44*a* (SCR case 45*a*) is mounted on the front auxiliary member 74, the case support part 81*b* comes into contact with the outer peripheral surface of the front end of the DPF case 44*a* (SCR case 45*a*) and supports the DPF case 44*a* (SCR case 45*a*) in such a manner that the DPF case 44*a* (SCR case 45*a*) does not come into contact with the upper surface of the main body part 73. Accordingly, a gap is formed between the lower surface of the front end of the DPF case 44*a* (SCR case 45*a*) and the upper surface of the main body part 73.

The rear protrusion part 75 is formed on the rear side of the main body part 73 (on the flywheel housing 61 side of the engine 100) so as to project further upward from the upper surface of the main body part 73. When the DPF case 44*a* (SCR case 45*a*) is mounted on the support base 8*x*, the rear protrusion part 75 comes into contact with the outer peripheral surface of the rear end of the DPF case 44*a* (SCR case 45*a*) and supports the DPF case 44*a* (SCR case 45*a*) in such a manner that the DPF case 44*a* (SCR case 45*a*) does not come into contact with the upper surface of the main body part 73. Accordingly, a gap is formed between the lower surface of the rear end of the DPF case 44*a* (SCR case 45*a*) and the upper surface of the main body part 73.

With this configuration, regarding the support base 8x, the DPF case 44a (SCR case 45a) can be supported in a state of being almost floating above the support base 8x, and therefore the heat dissipation effect can be improved.

Further, when the DPF case 44a (SCR case 45a) is mounted on the support base 8x, a member such as a band to be wrapped around the outer circumference of the case is not required. Therefore, since the DPF case 44a (SCR case 45a) need not be equipped with a structure for increasing the rigidity so as to withstand the tightening of a band, it is possible to reduce cost.

In the longitudinal direction of the engine 100, the mounting holes for fixing the DPF case 44a (SCR case 45a) are formed on the side surface of the rear protrusion part 75 on the flywheel housing 61 side (that is, the rear-side surface of the support base 8x).

In a state where the DPF case 44a (SCR case 45a) is placed on the support base 8x, as illustrated in FIG. 13, the flange part 46 of the DPF case 44a (SCR case 45a) comes into contact with the rear-side surface (the part where the mounting holes are formed) of the support base 8x. In a state where the flange part 46 of the DPF case 44a (SCR case 45a) is in contact with the rear-side surface of the support base 8x, the flange part 46 (that is, the DPF case 44a and the SCR case 45a) is fixed to the support base 8x via bolts or the like which are inserted in the longitudinal direction of the engine 100.

The side mounting parts 76 are formed in an approximately L shape when viewed in the longitudinal direction of the engine 100 and are used for fixing the support base 8x to the engine body 1. The side mounting parts 76 are arranged on both sides of the support base 8x in the width direction of the engine 100, respectively.

On each of the side surfaces of the side mounting parts 76 in the width direction and the height direction of the engine 100, the multiple mounting holes are formed. The side mounting parts 76 are fixed to the support base 8x via bolts or the like which are inserted into the mounting holes formed on the side surfaces of the engine 100 in the width direction. The side mounting parts 76 are fixed to the engine body 1 via bolts or the like which are inserted into the mounting holes formed on the side surfaces of the engine 100 in the height direction. In this way, the support base 8x can be easily mounted on the engine body 1.

Although the preferred embodiment of the present invention has been explained above, the above-described configuration can be changed as follows.

Instead of forming the vertically-mounted bosses 91a as the boss shapes, it is also possible to be configured as mounting holes simply formed in the front-side support bracket 91. Similarly, instead of forming the horizontally-mounted bosses 92a as the boss shapes, it is also possible to be configured as mounting holes simply formed in the rear-side support bracket 92.

It is also possible that horizontally-mounted bosses are formed on the front-side support bracket 91 and vertically-mounted bosses are formed on the rear-side support bracket 92.

The shapes of the front-side support bracket 91, the rear-side support bracket 92, the exhaust-side support bracket 93, and the intake-side support bracket 94 can be appropriately changed in consideration of interference with other components, etc.

At least one of the exhaust-side support bracket 93 and the intake-side support bracket 94 may be omitted.

It is also possible that the end parts of the DPF case 44a and the SCR case 45a on the flywheel housing 61 side are directly mounted on the case-rear-side mounting part 82. It is also possible that the case-rear-side mounting part 82 are changed to another shape such as a plate-shaped member or the like whose fixing position in the longitudinal direction of the support base 8 can be changed, for example.

It is also possible that the case-rear-side mounting part 82 includes three or more case mounting parts (fixing parts) arranged in the longitudinal direction of the support base 8.

If necessary, the second auxiliary member 88 can be mounted on the upper side of the support base 8. In this case, the shape of the second auxiliary member 88 can be changed as appropriate.

It is also possible that the ATD 43 is configured with the DPF device 44 only.

When viewed in a plan view, the longitudinal direction of the approximately rectangular shape of the engine 100 can be perpendicular to the direction in which the crankshaft 10 extends. Further, the engine 100 can be approximately square when viewed in a plan view.

DESCRIPTION OF REFERENCE NUMERALS

1 Engine body
8 Support base
43 ATD (exhaust gas purification device)
91 Front-side support bracket (first support bracket)
91a Vertically-mounted boss (vertically-mounted part)
92 Rear-side support bracket (second support bracket)
92a Horizontally-mounted boss (horizontally-mounted part)
100 Engine

The invention claimed is:

1. An engine having an exhaust gas purification device that purifies exhaust gas, the engine comprising:
   an engine body;
   a support base having at least a curved shape along outer peripheral surfaces of the exhaust gas purification device to mount the device thereon;
   a support bracket on one side of the engine body to be mounted on the engine body, so as to support the support base; and
   wherein the support bracket has a bracket mounting part at a lower surface of the curved shape of the support base.

2. The engine according to claim 1 comprising:
   a flywheel; and
   a cooling fan to rotate for cooling,
   wherein the cooling fan and the flywheel are arranged on sides that are opposite to each other in relation to the engine body interposed therebetween,
   the support bracket has a first bracket and a second bracket, wherein
   the first support bracket is arranged on the cooling fan side, and
   the second support bracket is arranged on the flywheel side.

3. The engine according to claim 2 further comprising:
   a third support bracket on a side that is different from any of the side of the engine body on which the first support bracket is arranged and the side on which the second support bracket is arranged; and
   a fourth support bracket on an opposite side of the engine body in relation to the third support bracket,
   wherein the third support bracket and the fourth support bracket are configured at least with a first component to be mounted on the engine body and a second component to be mounted on the support base.

4. The engine according to claim 1 comprising
a mounting member to mount the exhaust gas purification device onto the support base,
wherein the support base is equipped with a plurality of fixing parts capable of fixing the mounting member.

5. The engine according to claim 1 wherein the exhaust gas purification device is installed parallel to an axial direction of the engine body.

6. An engine comprising:
an engine body;
an exhaust gas purification device that purifies exhaust gas;
a support base having at least a curved shape along outer peripheral surfaces of the exhaust gas purification device for mounting the device thereon;
a support bracket on one side of the engine body to be mounted on the engine body, so as to support the support base; and
a bracket mounting part for mounting the support bracket, wherein
the support bracket is mounted on the bracket mounting part at a lower surface of the curved shape of the support base.

\* \* \* \* \*